May 30, 1950 L. BOTIMER 2,509,757
BEET HARVESTER
Filed March 24, 1947 3 Sheets-Sheet 1
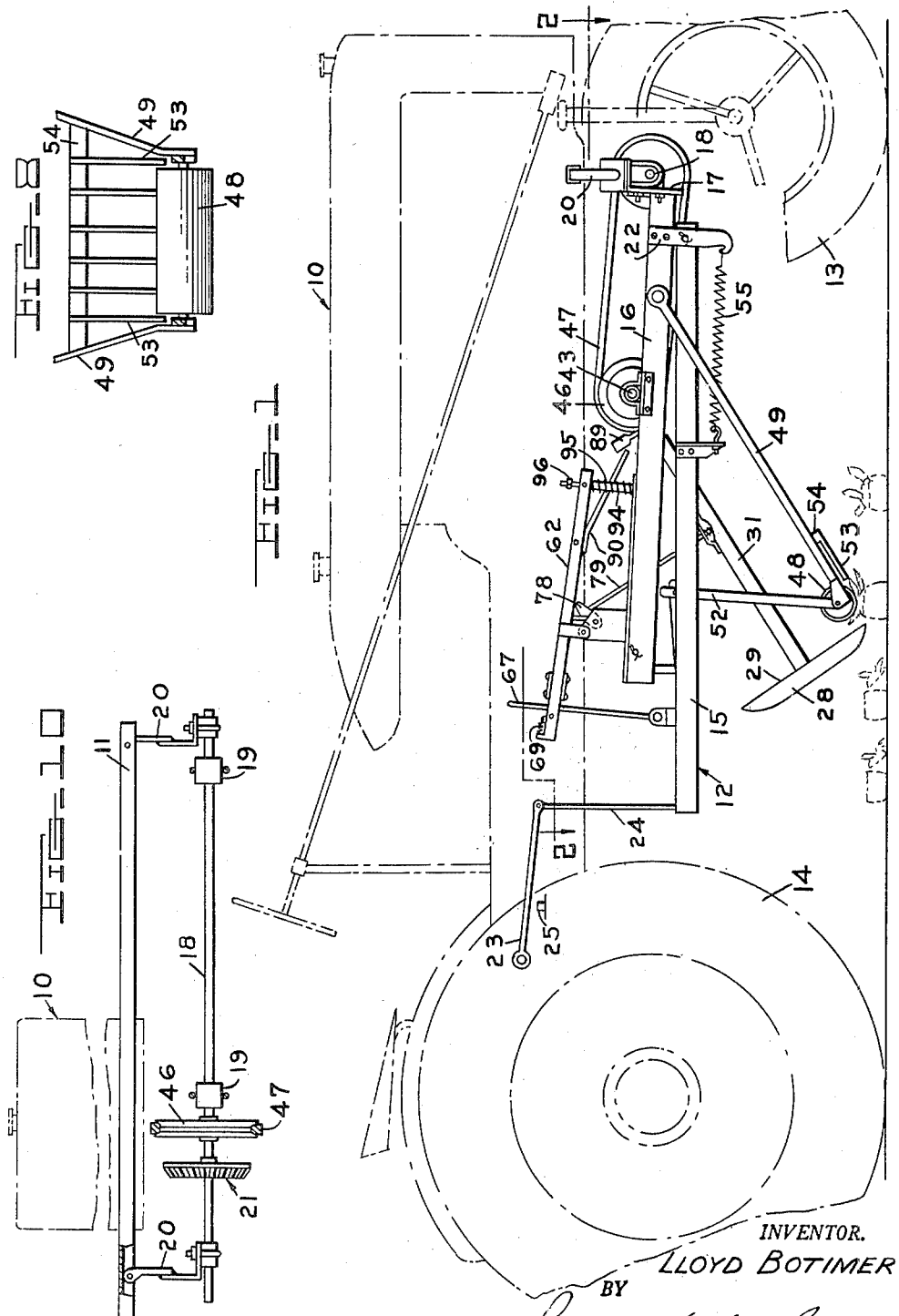
INVENTOR.
LLOYD BOTIMER
BY
Whittemore, Hulbert & Belknap
ATTORNEYS May 30, 1950 L. BOTIMER 2,509,757
BEET HARVESTER
Filed March 24, 1947 3 Sheets-Sheet 2
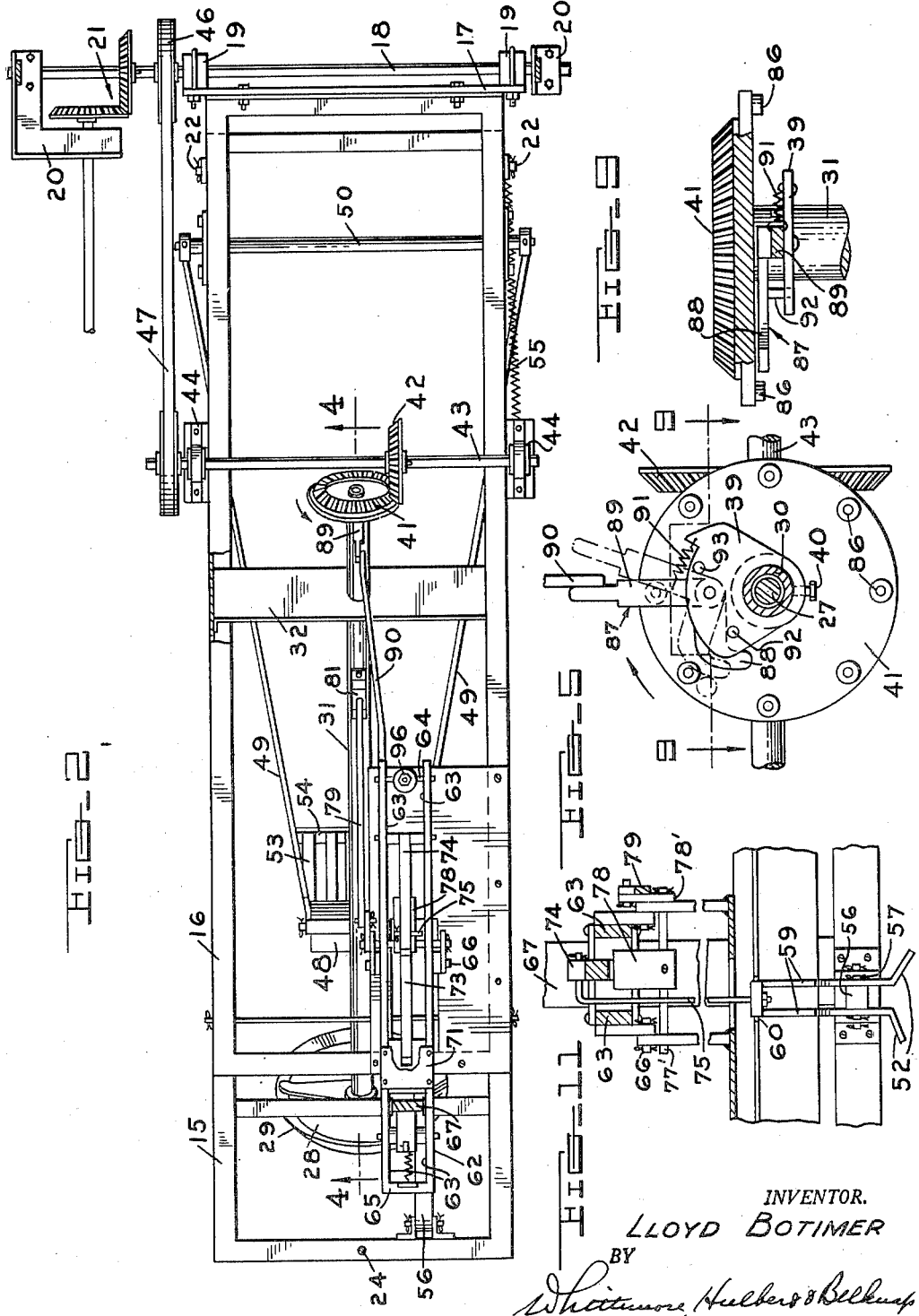
INVENTOR.
LLOYD BOTIMER
BY
Whittemore, Hulbert & Belknap
ATTORNEYS May 30, 1950  L. BOTIMER  2,509,757
BEET HARVESTER
Filed March 24, 1947  3 Sheets-Sheet 3
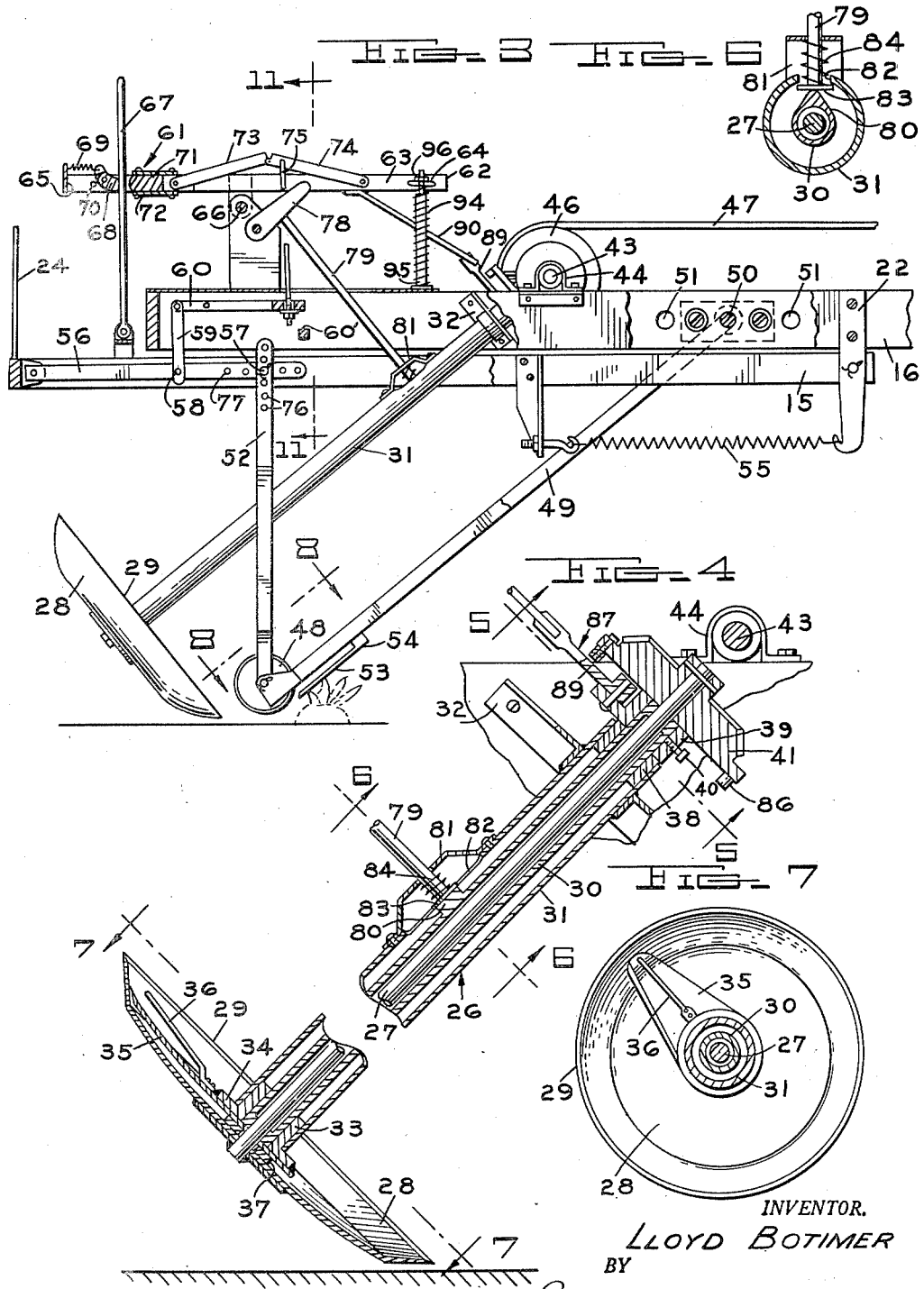
INVENTOR.
LLOYD BOTIMER
BY
Whittemore, Hulbert & Belknap
ATTORNEYS Patented May 30, 1950

2,509,757

UNITED STATES PATENT OFFICE 2,509,757

BEET HARVESTER

Lloyd Botimer, Vassar, Mich.

Application March 24, 1947, Serial No. 736,886

17 Claims. (Cl. 56—121.4)

This invention relates generally to agricultural equipment and refers more particularly to improvements in apparatus for topping beets or similar plants.

The present invention has as one of its principal objects to improve beet harvesting apparatus of the type wherein the elevation of the cutter or knife is determined by a feeler or gage positioned in advance of the cutter to successively contact the tops of the plants or beets in a selected row. In many of the above general types of beet harvesters the cutter is in the form of a knife and the latter is periodically rotated in response to elevating the same by the feeler to cut the beet tops with a slashing action.

Although apparatus operating in accordance with the above has greatly facilitated harvesting beets or other plants, nevertheless it entails rather complicated mechanism to assure proper timing of rotation of the knife in relation to its position relative to the beet to be topped and, moreover, is inherently out of balance during rotation of the knife. These objections are overcome with the present invention by providing apparatus wherein the cutter is in the form of a continuously rotatable disc so that the whipping action resulting from the use of a knife is eliminated and vibration of the apparatus is overcome to a great extent. In addition it is not necessary to time the operation of the cutter with respect to its position relative to the beet as the cutter is always in cutting position, and will commence cutting as soon as it is advanced into engagement with the beet.

Another object of this invention is to provide means for elevating the cutting disc in accordance with the height of the beet to be topped by engaging the beet in advance of the cutter with the elevating means and by connecting the elevating means to the cutter with linkage proportioned to raise the cutter at a rate less than the elevating means. Thus it is possible to effectively cut off the tops of short and relatively tall beets with a minimum amount of waste.

A further object of this invention is to minimize waste by providing beet harvesting apparatus having latch means for holding the cutting disc at an elevation determined by the beet to be topped during passage of the cutting disc through the beet.

Still another feature of the present invention is to provide means operable in timed relation to completion of the cutting operation to cast or throw the beet tops to one side of the row where they may be readily and conveniently retrieved.

A further object of this invention is to provide means operable as a unit with the casting or throwing means to clean the cutter with a wiping action so that the cutter is always in condition to perform a clean cut.

A still further object of this invention is to provide beet harvesting equipment of the above general type composed of a relatively few simple parts capable of being readily installed on orthodox tractors.

The foregoing as well as other objects will be made more apparent as this description proceeds, especially when considered in connection with the accompanying drawings, wherein:

Figure 1 is a semi-diagrammatic side elevational view of a beet harvester showing the same attached to a conventional type tractor;

Figure 2 is a sectional view taken on the line 2—2 of Figure 1;

Figure 3 is a side elevational view partly in section of the beet harvester shown in Figure 1;

Figure 4 is a sectional view taken substantially on the line 4—4 of Figure 2;

Figures 5, 6 and 7 are respectively cross sectional views taken on the lines 5—5, 6—6 and 7—7 of Figure 4;

Figure 8 is a sectional view taken on the line 8—8 of Figure 3;

Figure 9 is a sectional view taken on the line 9—9 of Figure 5;

Figure 10 is a semi-diagrammatic front elevational view of a part of the beet harvesting equipment; and Figure 11 is a sectional view taken on the line 11—11 of Figure 3.

The beet topping equipment illustrated herein is designed for attachment to orthodox tractors, and the cutting means thereof is adapted to be driven by the power take-off mechanism forming a part of the standard equipment of most tractors designed for agricultural use. A typical tractor is indicated in Figure 1 of the drawings by the reference character 10 having the usual power take-off mechanism (not shown) and having provision at one end for supporting a drawbar 11.

The beet topping equipment is indicated in the drawings by the reference character 12 and is positioned beneath the frame of the tractor between the front and rear wheels 13 and 14, respectively. The beet topping equipment comprises a main supporting frame 15 and an auxiliary frame 16. The auxiliary frame 16 has a mounting plate 17 at the front end thereof, and is pivotally supported on a transverse shaft 18 by journals 19 carried by the plate 17. The shaft 18 is suspended from the drawbar 11 by hangers 20 and is operatively connected to the power take-off mechanism of the tractor by gearing 21. It follows from the foregoing that the auxiliary frame 16 is supported for vertical swinging movement about the axis of the shaft 18.

The supporting frame 15 is positioned below the auxiliary frame 16 and is connected at its front end to the auxiliary frame by brackets 22. The rear end of the main frame 15 is connected to the usual tractor elevator arms 23 by rods 24. The arms 23 are positioned intermediate the ends on stops 25 and may be raised at will to lift both the auxiliary and supporting frames.

The frame 16 forms a support for a cutter assembly 26 comprising a number of parts to be presently described in detail including a rotatable shaft 27 and a cutting disc 28 dished in the manner shown in Figure 4 of the drawings to provide an annular cutting edge 29. The shaft 27 extends axially through an elongated tube 30 having an internal diameter greater than the external diameter of the shaft 27 and having the opposite ends reduced to form journals for rotatably supporting the shaft. The tube 30 with the shaft 27 therein extends axially through an elongated tubular housing 31 inclined forwardly and upwardly relative to the frame 16 in the manner indicated in Figures 1 to 4 inclusive of the drawings. The upper end of the tubular housing 31 is secured to the frame 16 intermediate opposite longitudinal sides of the latter by a plate 32 extending transversely of the frame 16 and secured thereto. The arrangement is such that when a row of beets is straddled by the tractor, the tubular housing 31 assumes a position directly above the beets in the row.

The lower end of the shaft 27 extends beyond the lower end of the tube 30, and the cutter 28 is permanently secured at its center to the projecting end of the shaft for rotation as a unit with the latter. The lower end of the tube 30 is journaled in the corresponding end of the housing 31 by a collar 33 secured to the tube 30 and having a flange 34 extending radially outwardly beyond the lower end of the housing. A scraper 35 and a casting rod 36 are secured to the flange 34 on the collar for rotation by the tube 30. A washer 37 is positioned on the shaft 27 between the base of the dished cutter 28 and the scraper to hold the latter in spaced relation to the cutter. However, the free or outer end of the scraper 35 is bent to extend along the cutting edge portion of the cutter to clean the latter.

The upper end of the sleeve 30 is journaled in the housing 31 by a collar 38 and projects beyond the corresponding end of the housing to provide a mounting for a driving member 39. The driving member is secured to the tube 30 by a set screw 40 and the purpose of this driving member will be presently described. The upper end of the shaft 27 projects beyond the upper end of the tube 30 and a beveled gear 41 is pinned or otherwise secured thereto. The gear 41 meshes with a corresponding beveled gear 42 keyed to a shaft 43 extending at right angles to the shaft 27 and having the ends suitably journaled on opposite sides of the frame 16 by bearings 44. A pulley 45 is fixed to one end of the shaft 43 and is connected to a pulley 46 on the drive shaft 18 by a belt 47. Thus it follows from the above that the shaft 27 and, consequently, the cutter are continuously driven by the power take-off mechanism of the tractor to which the equipment is applied.

The elevation of the cutter 28 with respect to the ground is varied proportionately to the height of the beets projecting above the ground, and this is accomplished by a gage in the form of a feeler wheel or roller 48. The roller 48 is positioned directly ahead of the cutter 28 in a position to engage the beet tops prior to the cutter, and is also carried by the frame 16. The roll is supported on an axle having the opposite ends suitably journaled on the lower ends of a pair of upwardly inclined struts 49 having the upper ends respectively pivotally supported on the opposite ends of a crossbar 50. The bar 50 extends transversely of the frame 16 adjacent the front end of the latter and the ends of the bar are suitably secured to opposite sides of the frame 16. As shown in Figure 3 of the drawings the opposite sides of the frame 16 are formed with openings 51 spaced from each other longitudinally of the frame 16 and adapted to selectively receive the ends of the bar 50 and thereby enable varying the distance between the roller 48 and the cutter 28.

The opposite ends of the axle on which the roller 48 is journaled are also connected to the frame 16 by substantially vertically extending links 52 having the lower ends pivotally connected to the axle and having the upper ends connected to the frame 16. The construction is such that as the feeler roller 48 successively engages the beets in any one row, the frame 16 is swung upwardly about the shaft 18 and the cutter 28 is correspondingly elevated. In this connection attention is directed to the fact that the roller 48 is relatively small in diameter and in order to effect a more or less gradual upward movement of the frame 16, the roller is supplemented by a plurality of arms 53 spaced from each other axially of the roller. As shown in Figure 8 of the drawings the upper ends of the arms 53 are secured to a cross member 54 secured to the struts 49 in advance of the roller and the lower ends of the arms extend to a position adjacent the underside of the roller 48. Thus, the arms 53 are inclined at an angle to the ground corresponding to the angle of inclination of the struts 49, and as a result, impart a gradual lifting movement to the frame 16 when a beet is encountered. Attention is further called to the fact that the frame 16 is counterbalanced by a spring 55 having the front end anchored on the bracket 22 at one side of the frame and having the rear end fixed to the frame 15.

It has previously been stated that the upper ends of the links 52 are connected to the frame 16. As shown in Figure 3 of the drawings the upper ends of the links 52 are respectively pivotally connected to the front end of a link 56 by a removable pin 57 and the rear end of the link 56 is pivoted to the frame 15 for swinging movement parallel to the plane of swinging movement of the frame 16. The link 56 is connected intermediate the ends to the lower end of a link 59 by a pin 58 and the upper end of the rod is connected intermediate the ends to the rear end of a horizontal link 60. The link 60 is pivoted adjacent its rear end to the frame 16 for vertical swinging movement and the front end portion of the link 60 is connected to snubbing mechanism 61 to be presently described. In general the purpose of the snubbing mechanism is to hold the frame 16 or cutter 28 in its elevated position during the time required for the cutter to sever the top of the beet adjacent the cutter.

The snubber mechanism 61 comprises an arm 62 having laterally spaced side members 63 connected together at the front ends by a crossbar 64 and connected together at the rear end by a crossbar 65. The arm 62 is pivoted intermediate the ends on the frame 16 by a pin 66 for swinging movement in a substantially vertical plane. A vertical bar 67 is pivoted at its lower end to the main frame 15 and extends upwardly between the side members 63 of the arm 62 at the rear side of the pivot 66. One side of the bar 67 is frictionally engaged by a dog 68 pivoted intermediate its ends on the arm 62 rearwardly of the bar 67 and having the lower portion urged into engagement with the bar 67 by a spring 69. The front end of the spring is connected to the upper end of the dog and the rear end of the spring is anchored on the crossbar 65 of the arm 62. A suitable stop 70 is positioned on the arm 62 for engagement with the dog 68 to limit the extent of swinging movement of the dog by the spring and thereby limit the force applied to the bar 67 by the dog in the released position of the snubber 61, shown in Figure 3 of the drawings.

A shoe 71 is slidably supported on the arm 62 at the front side of the vertical bar 67 between a pair of plates 72 extending between the side members 63 of the arm and secured thereto. The shoe 71 is located directly opposite the lower portion of the dog 68 and is pivotally connected to the rear end of a link 73 having the front end pivotally connected to the rear end of a second link 74. The front end of the link 74 is pivotally connected to the arm 62 and a portion of the link 74 intermediate the ends is connected to the upper end of a vertical rod 75 having the lower end connected to the front end of the link 60.

The foregoing construction is such that as the feeler means (roller 48 and bars 63) contacts a beet, an upward thrust is imparted to the front end of the link 56 by the links 52. The links 52 act to swing the link 56 upwardly and the latter link acts through the link 59 to swing the front end of the link 60 in a downward direction. Thus a downward pull is applied to the rod 75 and the toggle formed by the links 73 and 74 is straightened to forcibly urge the shoe 71 into engagement with the front side of the vertical bar 67 on the frame 16. As stated above, the rear side of the bar 67 is frictionally engaged by the dog 68 so that the latter cooperates with the shoe to yieldably grip the bar 67.

As the front end of the link 60 is swung downwardly to straighten the toggle linkage, it abuts a fixed stop 60' secured to the auxiliary frame 16 so that continued upward movement of the links 52 by the feeler means raises the frame 16 and cutter 28 a distance depending upon the height of the beet engaged by the feeler means. During this upward movement of the frame 16 relative to the supporting frame 15, the snubber mechanism slides upwardly on the vertical rod 67 and frictionally holds the auxiliary frame 16 or cutter 28 in its elevated position. Thus, as the tractor advances the cutter severs the top off the beet and the gear ratio is such that the cutter remains in its elevated position while the tractor travels the necessary distance to enable the cutter to complete the cutting operation.

In some cases it may be necessary to vary the spacing between the feeler roller 48 and the cutter 28 to compensate for beets having substantially different heights. As stated above, the feeler roller 48 may be positioned closer or further away from the cutter 28 by selectively locating the rod 50 in the longitudinally spaced openings 51 formed in the frame 16. Also the elevation of the feeler roller 48 relative to the cutter may be altered in accordance with the average heights of the beets to be cut by forming a plurality of vertically spaced openings 76 in the upper ends of the links 52 for selectively receiving the pin 57.

The rate of upward movement of the cutter 28 by the feeler means is less than the rate of upward displacement of the feeler means due to the leverage advantage obtained by the links 56. Thus the gap between the feeler means and cutter is increased and more economical cutting of the large or small beets in proportion to their size is rendered possible. The relative movement between the cutter and feeler means may be varied by changing the effective length of the link 56, and for this purpose, a plurality of spaced openings 77 are formed in the free end of the link 56 for selectively receiving the pin 57.

Subsequent to cutting the top off a beet, it is, of course, necessary to release the snubber mechanism 61 to permit return movement of the frame 16 to its initial starting position. This is accomplished by a lever 78 pivoted at one end on the frame 16 adjacent the pivot 66 for the arm 62 and having the free end positioned to engage the bottom side of the link 74 intermediate the ends thereof. Thus swinging movement of the lever 78 in a counter-clockwise direction breaks the toggle formed by the links and retracts the shoe 71 from the vertical bar 67. As a result the frame 16 is released and drops downwardly to its initial position shown in Figure 3 of the drawings. As shown in Figure 11 of the drawings, the lever 78 is secured to a pin 77' suitably mounted on the frame 16 and having a lever 78' secured thereto at one end thereof. The free end of the lever 78' is connected to the upper end of a rod 79 having the lower end positioned to engage a cam 80 fixed to the tube 30. As shown in Figure 4 of the drawings, the rod 79 is guided by a bracket 81 fixed to the housing 31 and the latter is slotted at 82 to enable extending the lower end of the rod through the housing. It will also be noted from Figure 4 of the drawings that the lower end of the rod 79 is formed with a flat head 83 for engagement with the cam 80 and is urged into contact with the cam by a coil spring 84 surrounding the rod. One end of the spring 84 abuts the bracket 81 and the other end of the spring seats on the flat head 83, so that the spring also functions to hold the lever 78 in its inoperative or released position.

The tube 30 is rotated in timed relation to the operation of the cutter 28 to sever the top from a beet, and in actual practice, serves to operate the casting rod 36 upon completion of the cutting operation to throw the beet top to one side of the row. Referring now more in detail to the means provided for periodically rotating the tube 30, it will be noted from Figures 4, 5 and 9 of the drawings that the gear 41 is provided with a plurality of pins 86 projecting downwardly from the peripheral portion thereof in spaced relation to each other circumferentially of the gear 41. Cooperating with any one of the pins 86 to connect the driving member 39 on the sleeve 30 to the gear 41 is a bell crank lever 87 having right angularly arranged arms 88 and 89. The lever 87 is pivoted intermediate the arms to the driving member 39 for swinging movement in a plane parallel to the plane of rotation of the gear 41 and the arm 88 is located within the confines of the pins 86. The arm 89 is offset downwardly from the arm 88 a distance somewhat greater than the length of the pins 86 and the free end portion projects outwardly beyond the gear 41 for engagement with an operating element 90.

In the full line position of the bell crank lever 87 shown in Figure 5 of the drawings, the arm 88 is positioned at the inner side of the path of travel of the pins 86 and the gear 41 is free to rotate relative to the drawing member 39 or tube 30. The lever 87 is normally held in the above position against the action of a spring 91 by the operating member 90. One end of the spring 91 is connected to the driving member 39 and the other end of the spring is connected to the arm 89 of the bell crank lever. As a result, when the arm 89 is released from the operating member 90, the spring swings the lever 87 in a direction to engage the arm 88 with one of the pins 86 and thereby connects the driving member 39 or tube 30 to the gear 41. Thus, continued rotation of the gear 41 effects a corresponding rotation of the casting rod 36. In this connection it will be noted from Figure 5 of the drawings that a pair of pins 92 and 93 are provided on the member 39. The pin 92 acts as a stop to locate the arm 88 of the lever 87 in its inoperative position relative to the pins 86 and the stop 93 functions as a stop to position the lever 87 with the arm 88 in operative relationship to the pins 86.

The member 90 is secured to the arm 62 and is operated by the latter with the aid of a coil spring 94. In detail, the spring 94 surrounds a post 95 having the lower end fixed to the frame 16 and having a reduced threaded part extending freely through an opening formed in the cross bar 64 at the front end of the arm 62. The lower end of the spring abuts the frame 16 and the upper end of the spring abuts the cross bar 64 in a manner to urge the bar 64 against an adjusted stop 96 in the form of a nut threaded on the reduced upper end of the post 95.

The above construction is such that when the arm 62 is held in the above position shown in Figure 3 of the drawings by the spring 94, the member 90 is in engagement with the free end portion of the arm 89 on the bell crank lever 87 and holds the latter in its inoperative or full line position shown in Figure 5 of the drawings, wherein the gear 41 is released from the driving member 39 or tube 30. However, after the snubber 61 is operated, the arm 62 is swung in a clockwise direction about the pin 66 by upward movement of the frame 16, and this movement is sufficient to disengage the member 90 from the arm 89 of the bell crank 87. As a result, the spring 91 swings the bell crank lever to its operative position shown by the dot and dash lines in Figure 5 of the drawings wherein the arm 88 of the lever 87 engages one of the pins 86 and connects the gear 41 to the tube 30 through the driving member 39.

It follows from the above that the tube 30 is operated to rotate the casting rod 36 and throw the beet top cut off by the cutter 28 to one side. Thus, when a row of beets has been traversed by the apparatus, all of the severed tops are arranged in a row to one side of the beet row and may be readily collected. It will, of course, be noted that rotation of the sleeve also operates the cam 80 to release the snubber mechanism 61 from the vertical bar 67 and thereby permit the frame 16 to drop to its initial starting position. The cam 80 is angularly positioned with respect to the casting rod 36 to delay operation of the snubber mechanism until after the cutter 36 has operated to sever the top off the beet. As soon as the snubber 61 is released from the bar 67, the spring 94 acts on the front end of the arm 62 to return the latter to its uppermost position against the adjustable stop 96. This stop is adjusted so that when engaged by the front end of the arm 62, the free end of the member 90 assumes a position in the path of rotation of the free end portion of the bell crank arm 89. As a result, the member 90 contacts the arm 89 and swings the bell crank 87 to its full line position shown in Figure 5 of the drawings wherein the gear 41 is released from the driving member 39. Rotation of the casting rod 36 by the tube 30 is then discontinued and apparatus is placed in condition for the next cycle of operation.

What I claim as my invention is:

1. Beet harvesting apparatus adapted for attachment to a tractor having a power take-off mechanism, comprising a frame adapted to traverse a row of beets, a cutter rotatably supported on the frame in a position to successively engage the beets and sever the top portions off the beets, a casting element supported by the frame for rotation about the axis of the cutter and positioned to cast the severed beet tops to one side of the row, driving means between the power take off of the tractor and cutter for rotating the latter, and means operated in timed relation to completion of the cutting operation to connect the casting element to the driving means.

2. Beet harvesting apparatus comprising a frame adapted to traverse a row of beets and supported for movement in opposite directions substantially vertically with respect to the row of beets, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, a casting element rotatably supported by the frame in a position to engage the severed beet tops and cast the latter to one side of the beet row, driving mechanism for rotating the casting element, a releasable connection between the casting element and driving mechanism, and means operable in timed relation to upward movement of the frame for connecting the casting element to the driving mechanism and operable in timed relation to downward movement of the frame to release the connection between the driving mechanism and casting element.

3. Beet harvesting apparatus comprising a supporting frame adapted to traverse a row of beets, a cutter disc rotatably supported on the frame in a position to successively engage the beets and sever the top portions off the beets, means engageable with the beets in advance of the cutter for elevating the cutter an amount determined by the extent the beet preceding the cutter projects above the ground, a casting element rotatably supported by the frame in a position to engage the severed beet tops and cast the latter to one side of the beet row, driving mechanism for rotating the casting element, and means operated in timed relation to movement of the cutter in an upward direction by the elevating means to connect the casting element to the driving mechanism.

4. Beet harvesting apparatus adapted for attachment to a tractor having a power take-off mechanism, comprising a frame adapted to traverse a row of beets, a cutter rotatably supported on the frame in a position to successively engage the beets and sever the top portions off the beets, means engageable with the beets in advance of the cutter for elevating the cutter an amount determined by the extent the beet preceding the cutter projects above the ground, driving means between the power take-off mechanism and cutter for rotating the latter, a casting element supported by the frame for rotation about the axis of the cutter and positioned to cast the severed beet tops to one side of the beet row, a releasable connection between the casting element and driving means, and means operated in timed relation to movement of the cutter in an upward direction to establish said releasable connection and effect rotation of the casting element.

5. Beet harvesting apparatus comprising a supporting frame adapted to traverse a row of beets and pivoted adjacent one end for vertical swinging movement, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, means for holding the frame in its elevated position during the cutting operation, a casting rod rotatably supported by the frame in a position to engage the severed beet tops and cast the latter to one side of the beet row, driving means for rotating the cutter, means operating in timed relation to elevating the frame for connecting the casting rod to said driving means, and means operating in timed relation to rotation of the casting rod by the driving means to release said holding means.

6. Beet harvesting apparatus comprising a supporting frame adapted to traverse a row of beets and pivoted adjacent one end for vertical swinging movement, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, means for holding the frame in its elevated position during the cutting operation, a casting element rotatably supported by the frame in a position to engage the severed beet tops and cast the latter to one side of the beet row, means for rotating the cutter, means responsive to upward movement of the frame for rotating the casting element, and means operating in timed relation to rotation of the casting element to release said holding means.

7. Beet harvesting apparatus comprising a supporting frame adapted to traverse a row of beets and pivoted adjacent one end for vertical swinging movement, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, a casting element rotatably supported by the frame in a position to engage the severed beet tops and cast the latter to one side of the beet row, a releasable snubbing mechanism responsive to upward movement of the frame to hold said frame in a raised position, means for rotating the cutter, means responsive to upward movement of the frame for rotating the casting element, and means operating in timed relation to rotation of the casting rod to release said snubbing mechanism.

8. Beet harvesting apparatus comprising a supporting frame adapted to traverse a row of beets and pivoted adjacent one end for vertical swinging movement, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, a casting rod rotatably supported by the frame in a position to engage the severed beet tops and cast the latter to one side of the beet row, a releasable snubbing mechanism responsive to upward movement of the frame to hold said frame in a raised position, means for rotating the cutter, means responsive to upward movement of the frame for rotating the casting rod, means operating in timed relation to rotation of the casting rod to release the snubbing mechanism, and means responsive to return movement of the frame to discontinue rotation of the casting rod.

9. Beet harvesting apparatus adapted for attachment to a tractor having a power take-off mechanism, comprising a frame adapted to traverse a row of beets, a cutter disc rotatably supported on the frame in a position to successively engage the beets and sever the top portions off the beets, means engageable with the beets in advance of the cutter for elevating the cutter an amount determined by the extent the beet preceding the cutter projects above the ground, driving means between the power take-off mechanism and cutter for rotating the latter, a casting rod supported by the frame for rotation about the axis of the cutter and positioned to cast the severed beet tops to one side of the beet row, means responsive to elevating the cutter for connecting the casting rod to the driving means, means also responsive to elevating the cutter to hold the latter in its raised position and releasable to permit return movement of the cutter in response to rotation of the casting rod, and means responsive to return movement of the cutter to disconnect the casting rod and driving means.

10. Beet harvesting apparatus comprising a supporting frame adapted to traverse a row of beets and pivoted adjacent one end for vertical swinging movement, a cutter rotatably supported on the frame in a position to successively engage the beets and sever the top portions off the beets, means supported on the frame in a position to contact the beets in advance of the cutter to lift the frame and raise the cutter an amount determined by the extent the beet preceding the cutter projects above the ground, a casting rod rotatably supported by the frame in a position to engage the severed beet tops and cast the latter to one side of the beet row, driving means for rotating the cutter, means responsive to upward movement of the frame by the lifting means to connect the casting rod to said driving means, snubbing mechanism responsive to upward movement of the frame for holding the frame in its elevated position and releasable in response to rotation of the casting rod to permit return movement of the frame, and means responsive to return movement of the cutter to disconnect the casting rod from the driving means.

11. Beet harvesting apparatus comprising a supporting frame adapted to traverse a row of beets, a cutter rotatably supported on the frame in a position to successively engage the beets and sever the top portions off the beets, driving mechanism for the cutter including a shaft supported on the frame and having a driving member fixed thereto, a tube supported on the shaft and rotatable relative to said shaft, a casting element fixed to the tube adjacent the cutter, a releasable driving connection between the tube and driving member, and means for releasing the connection.

12. Beet harvesting apparatus comprising a supporting frame adapted to traverse a row of beets, a cutter rotatably supported on the frame in a position to successively engage the beets and sever the top portions off the beets, means engageable with the beets in advance of the cutter for elevating the cutter an amount determined by the extent the beet preceding the cutter projects above the ground, means for rotating the cutter, releasable latch means operated in timed relation to the elevating means for holding the cutter in its raised position, and means for releasing the latch means in timed relation to rotation of the cutter.

13. Beet harvesting apparatus comprising a supporting frame adapted to traverse a row of beets and pivoted adjacent one end for vertical swinging movement, a cutter rotatably supported on the frame in a position to successively engage the beets and sever the top portions off of the beets, means supported on the frame in a position to contact the beets in advance of the cutter to lift the frame and raise the cutter an amount determined by the extent the beet preceding the cutter projects above the ground, means for rotating the cutter, and latch means for holding the frame in its elevated position during passage of the cutter through an adjacent beet and releasable subsequent to the severing operation to permit return movement of the frame.

14. Beet harvesting apparatus comprising a supporting frame adapted to traverse a row of beets, a cutter rotatably supported on the frame in a position to successively engage the beets and sever the top portions off the beets, elevating means engageable with the beets in advance of the cutter and movable upwardly an amount determined by the extent the beet preceding the cutter projects above the ground, linkage connecting the elevating means to the cutter for raising the latter at a rate less than the rate of upward movement of the elevating means, releasable latch means operated in timed relation to the elevating means for holding the cutter in its raised position, and means for releasing the latch means in timed relation to rotation of the cutter.

15. Beet harvesting apparatus comprising a supporting frame adapted to traverse a row of beets, means for severing the top portions of the beets including a cutter supported by the frame for rotation, means positioned adjacent the cutter for throwing the severed beet tops laterally including a casting element supported on the frame for rotation relative to the cutter, driving mechanism operatively connected to the cutter for rotating the latter, and means periodically connecting the casting element to the driving means for rotating said casting element.

16. Beet harvesting apparatus comprising a supporting frame adapted to traverse a row of beets, means for severing the top portions of the beets including a cutter disc supported by the frame rotation, means positioned directly above the disc for throwing the severed beet tops laterally including a casting element supported on the frame for rotation relative to the cutter disc about the axis of the latter, driving mechanism operatively connected to the cutter disc for rotating said disc, and means for periodically connecting the casting element to and disconnecting the casting element from said driving mechanism.

17. Beet harvesting apparatus comprising supporting structure adapted to traverse a row of beets, means mounting the structure for movement in opposite directions generally vertically with respect to the row of beets, means for severing the top portions of the beets including a cutter supported on the structure for rotation, means positioned adjacent the cutter for throwing the severed portions of the beets laterally with respect to the row of beets including a casting element supported on said structure for rotation, means carried by the supporting structure in a position to engage the beet tops in advance of the cutter and thereby determine the elevation of the supporting structure, driving mechanism operatively connected to the cutter for rotating the latter, a releasable connection between the driving mechanism and casting element for rotating the latter, and means for establishing and releasing said connection in timed relation to movement of the supporting structure in opposite directions.

LLOYD BOTIMER.

REFERENCES CITED

The following references are of record in the file of this patent:

UNITED STATES PATENTS

| Number | Name | Date |
|---|---|---|
| 861,511 | Gettelmann | July 30, 1907 |
| 1,531,195 | Kopitke | Mar. 24, 1925 |
| 1,568,810 | Djuberg | Jan. 5, 1926 |

FOREIGN PATENTS

| Number | Country | Date |
|---|---|---|
| 28,476 | Great Britain | of 1908 |